Dec. 22, 1959        A. M. LIPPISCH        2,918,231
FLUID SUSTAINED AND FLUID PROPELLED AIRCRAFT
Filed Sept. 17, 1956
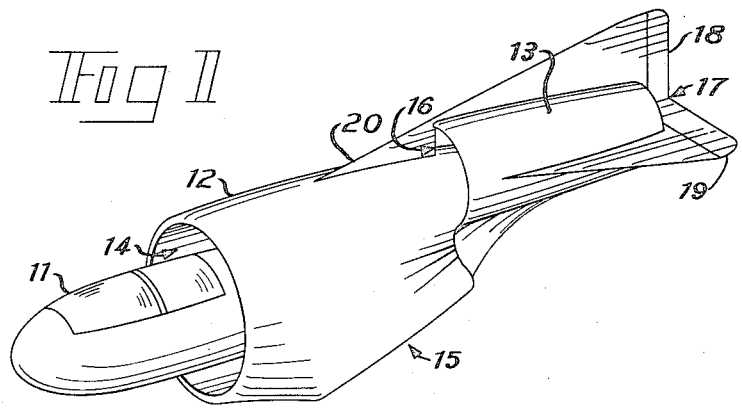
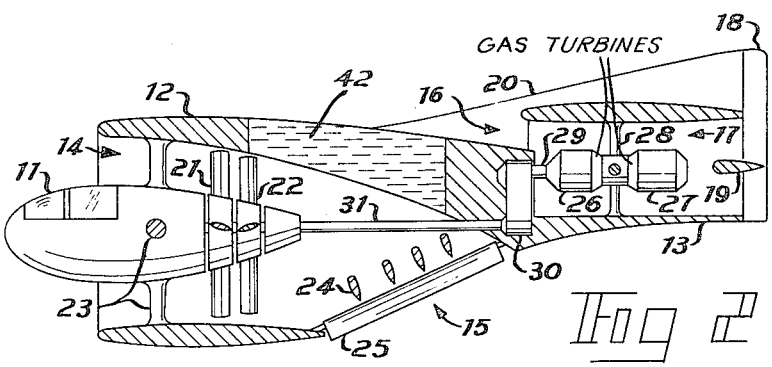
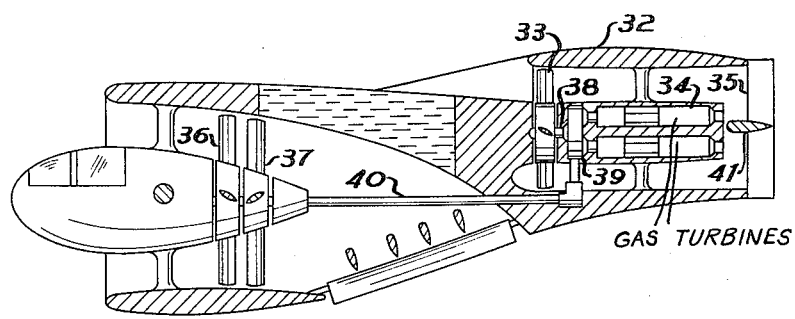
INVENTOR.
ALEXANDER M. LIPPISCH
BY
*Marvin Moody*
ATTORNEY મ
United States Patent Office 2,918,231
Patented Dec. 22, 1959

2,918,231

FLUID SUSTAINED AND FLUID PROPELLED AIRCRAFT

Alexander M. Lippisch, Cedar Rapids, Iowa, assignor to Collins Radio Company, Cedar Rapids, Iowa, a corporation of Iowa Application September 17, 1956, Serial No. 611,410

1 Claim. (Cl. 244—23)

This invention pertains to wingless aircraft or aerodynes in which propellers are enclosed within the air ducts and particularly to aircraft having a plurality of air ducts.

Aircraft constructed according to this invention are capable of vertical flight, hovering, or horizontal flight. Previously, when this degree of maneuvering has been required, helicopters have been used. For example, helicopters have been used in metropolitan areas to carry passengers and cargo from large airports outside of cities to heliports that may be constructed on roof tops of large buildings in downtown areas.

Aircraft utilizing air ducts provide improved and more economical operation than that provided by helicopters. Advantages derived from using aircraft that have air ducts are given in a co-pending patent application, "Ducted Propeller Aircraft," filed by Alexander M. Lippisch.

Helicopters with large horizontal blades have complicated gear systems for changing or modulating the pitch of the blades as they revolve. This modulation of pitch is required because of constantly changing air speeds encountered by each blade during horizontal flight. In aircraft utilizing air ducts for enclosing propellers, differences in air speed are not encountered by the propellers and, therefore, complicated gear systems for modulating pitch are not required. Practical limits on the rotational velocity of large horizontal propeller blades severely limit the cruising speed of helicopters. The simpler construction and increased efficiency of aircraft having air ducts contribute to their relatively high cruising speed.

Still greater efficiency for aircraft having air ducts is obtained by utilizing fore and aft air ducts according to the present invention. These air ducts each have air propelling means. The aft air duct reduces parasitic drag by propelling rearwardly any boundary layer of air adjacent to the outer surfaces of the forward part of the main fuselage.

An object of this invention is to obtain increased efficiency in ducted aircraft by utilizing propelling means in separate fore and aft air ducts.

A feature of this invention is the location of the cockpit ahead of the propellers.

Another feature is the use of variable pitch propellers in both fore and aft air ducts for obtaining optimum settings for different flight conditions.

The objects and appended claims for the aircraft of this invention may be better understood with reference to the single page of drawings in which:

Figure 1 shows a front oblique perspective view of an aircraft according to this invention;

Figure 2 is a side view of aircraft of Figure 1 in which portions of the fuselage have been cut away to show air flow systems and air propelling systems;

Figure 3 is a side view having cut-away portions for showing a modification of the air propelling system.

In general, the air flow system of aircraft of this invention utilizes separate fore and aft air ducts having individual air propelling means. Although in a single aircraft different sources of power may be used for the different air ducts, preferably for reliability a plurality of engines operating together is used to supply power to all air propelling means.

The operating efficiency of aircraft constructed according to this invention is derived from using a plurality of air ducts in a single aircraft. The fore air duct is the main duct and directs a large stream of air downwardly and rearwardly near the center of gravity of the aircraft. This air stream provides nearly all of the lift and most of the thrust necessary to sustain flight. The aft air duct provides additional thrust and, in cooperation with the rear control surfaces of the aircraft, provides effective control of the attitude of the aircraft. The intake for the aft air duct surrounds the rear portion of the structure that contains the main air duct and removes a boundary layer of air that tends to cling to the outer surface of the structure. By propelling the boundary layer of air rearwardly, drag is reduced.

In Figure 1 is shown an aircraft having a forward projecting centrally located cockpit 11, a main air duct 12 concentric with the rear portion of the cockpit, and a secondary air duct 13 located at the rear of the main air duct. The cockpit and the air ducts are substantially cylindrical and have axes nearly coincident with the longitudinal axis of the aircraft. Although landing gear is not shown in the illustrations, it is to be understood that conventional landing gear may be used.

The fore or main air duct 12 has a main intake opening 14 encompassing cockpit 11. This duct curves slightly downwardly and gradually changes in cross-sectional area to communicate with a substantially rectangular exhaust opening 15 that faces in a slanting direction downwardly and rearwardly.

The aft or auxiliary air duct 13 has a cylindrical intake opening 16 surrounding structure which extends rearwardly from air duct 12, and an exhaust opening 17 for expelling air and exhaust gases rearwardly. In addition to providing thrust, this air stream is effective in controlling the attitude of the aircraft. Attitude is determined largely by positioning rudder 18 and elevator 19 to change the direction of flow of the air stream expelled from the rear opening. Stability of the aircraft is increased by fin 20 that extends longitudinally on top of the aircraft from in front of intake opening 16 to rudder 18 at the rear.

In Figure 2 a portion of the air ducts have been cut away in order to show the air flow system. The rear portion of the forward structure containing cockpit 11 tapers inwardly to support counter-rotating propellers 21 and 22. This structure is mounted co-axially in the main air duct 12 by radial supporting bars 23. Air expelled from main air duct opening 15, which is located near the center of gravity of the aircraft, provides the main lift and thrust required for flight. The air duct is so shaped that the required lift and thrust is obtained for average flight conditions with little change in direction of the air stream by deflecting vanes. In opening 15 are disposed lateral deflecting vanes 24 and perpendicular thereto roll flap 25. These control surfaces are operated in a usual manner by conventional control system. During take-off, the deflecting vanes are turned for directing the air stream vertically downwardly so that the aircraft may rise vertically. When desired altitude has been attained, the vanes are turned for directing the air stream rearwardly and downwardly for obtaining required lift and thrust for horizontal flight. Deflecting vanes 24 correspond to trim tabs in wing aircraft in that their position needs to be changed only for different flight conditions. Small changes and corrections required for keeping the aircraft on its course are made by operation of rudder 18 and elevator 19. Roll flap 25 is operated in a conventional manner for stabilizing the aircraft.

Aft auxiliary air duct 13 contains gas turbine engines 26 and 27 which are mounted by radial supports 28. Gas turbine engines 26 and 27 are mounted in tandem and are connected to a common drive shaft. Thrust rearwardly is provided by a jet exhaust system. Exhaust gases from the engines are directed rearwardly and cause a flow of air from near the outer surface of the aircraft into auxiliary air intake 16. The air flow which enters the intake is combined with the exhaust gases and expelled rearwardly through rear exhaust opening 17 over rudder 18 and elevator 19. Rudder 18 and elevator 19 are controlled in the conventional manner. A change in position of either the rudder or the elevator is very effective to change the attitude of the aircraft because of the strong air flow over the control surfaces. For increased stability, the aft air duct may be inclined slightly upwardly toward the rear. Power for rotating propellers 21 and 22 is applied through engine drive shaft 29, gear system 30, and propeller drive shaft 31 to the propellers. Fuel tanks may be located in space 42 above the main air duct.

The aft air flow system 32 in Figure 3 has been modified to include propeller 33 that is mounted directly in front of engines 34. This propeller, which is used in addition to the exhaust stream from engines 34, increases the air flow through the rear air duct and over rudder 35 and elevator 41 for increasing the effectiveness of the rear control surfaces in changing the course of the aircraft. Power from engines 34 is applied through central drive shaft 38 to auxiliary propeller 33, and through gear system 39 and propeller drive shaft 40 to main counter-rotating propellers 36 and 37. The pitch of the main propellers and of the auxiliary propeller may be changed as required for obtaining the proper ratio of power for the different systems according to flight conditions.

Aircraft constructed according to this invention may be used advantageously in service requiring take-off and landing in small space. For such service the aircraft operates efficiently and has a higher rate of speed than aircraft used heretofore. Efficiency of the aircraft is much greater than that of conventional wing type aircraft because of the greater efficiency obtained by having shrouded propellers rather than open propellers. Efficiency is further increased by separate fore and aft air ducts rather than a single long air duct. In this system using a plurality of air ducts, losses due to air friction are minimum. Efficiency is further improved by the use of the aft air duct for removing the boundary layer of air from near the outer surface of the aircraft.

During take-off, horizontal deflecting vanes in the outlet of the main air duct are positioned for directing an air stream downwardly. The aircraft rises vertically until the desired altitude is attained. Then for horizontal flight the vanes are turned by operation of trim controls for directing the air stream in a slanting direction rearwardly and downwardly. After the vanes are trimmed for horizontal flight, the aircraft is controlled by usual means for operating the roll flap that is located at the main exhaust opening and for operating the rudder and elevator that are located in the rear exhaust opening. For reliability, multiple engines are used so that flight may be sustained in the event of engine failure. In designs according to the accompanying illustrations, noise in the cockpit is minimized by placing the cockpit ahead of motors and air propelling systems. Furthermore, since noise is directed rearwardly during horizontal flight, noise on the ground is less when using aircraft with shrouded propellers than when using aircraft with open propellers.

Although the invention has been described with respect to particular embodiments, aircraft of various sizes designed for different types of services that utilize fore and aft air duct systems are within the spirit and scope of the invention as set forth in the following claim.

What is claimed is:

A wingless aircraft having an elongated streamlined fuselage, said fuselage comprising fore and aft parts, said fore part having a fore air duct, said aft part having an aft air duct, first and second air-propelling means mounted in said fore and aft air ducts respectively, said fore air duct having a first inlet facing forward, said first inlet being a major portion of the front profile of said aircraft, said fore part having a side outlet for terminating said fore air duct, the walls of said fore air duct being streamlined and gradually curved such that a stream of air from said first air-propelling means is directed from said side outlet rearwardly and outwardly at the proper angle for substantially sustaining said aircraft in horizontal forward flight, said fore part tapering inwardly toward the rear, said aft air duct having a second inlet substantially encircling the rear tapering portion of said fore part so that said second air-propelling means is effective to draw air rearwardly over the outer surface of said fore part, said aft air duct extending longitudinally through said aft part and having a rear outlet that faces rearwardly, a plurlity of lateral trim-control air-deflecting vanes and a fore-to-aft roll flap mounted across said side outlet, and a rudder and an elevator mounted across said rear outlet.

References Cited in the file of this patent

UNITED STATES PATENTS

| | | |
|---|---|---|
| 1,876,682 | Janney | Sept. 13, 1932 |
| 2,384,893 | Crook | Sept. 18, 1945 |
| 2,692,724 | McLeod | Oct. 26, 1954 |
| 2,759,686 | Griffith | Aug. 21, 1956 |

FOREIGN PATENTS

| | | |
|---|---|---|
| 652,942 | Great Britain | May 2, 1951 |
| 679,445 | Great Britain | Sept. 17, 1952 |
| 745,344 | Great Britain | Feb. 22, 1956 |